United States Patent
Fang et al.

(10) Patent No.: US 12,473,381 B1
(45) Date of Patent: Nov. 18, 2025

(54) METHOD FOR SEPARATING AND PURIFYING FUCOIDAN

(71) Applicant: Syngars Technology Co., Ltd., Lanxi (CN)

(72) Inventors: Jinfa Fang, Lanxi (CN); Qiang Huang, Lanxi (CN); Xinming Jiang, Lanxi (CN)

(73) Assignee: Syngars Technology Co., Ltd., Zhejiang (CN)

( * ) Notice: Subject to any disclaimer, the term of this patent is extended or adjusted under 35 U.S.C. 154(b) by 0 days.

(21) Appl. No.: 19/184,071

(22) Filed: Apr. 21, 2025

(30) Foreign Application Priority Data

Jul. 8, 2024 (CN) .......................... 202410907832.5

(51) Int. Cl.
 *C08B 37/00* (2006.01)
(52) U.S. Cl.
 CPC ................. *C08B 37/0063* (2013.01)
(58) Field of Classification Search
 CPC ................................. C08B 37/0063
 See application file for complete search history.

(56) References Cited

FOREIGN PATENT DOCUMENTS

CN 116813809 A 9/2023

OTHER PUBLICATIONS

Sugiono, Biosc. Biotech. Res. Comm vol. 12 (4) 594-903 2019. (Year: 2019).*
Ding, Journal of the Taiwan Institute of Chemical Engineers 149 (2023) 105008. (Year: 2023).*
Notification to Grant Patent Right for Invention for China Application No. 202410907832.5, Issuing Date Aug. 14, 2024, 2 pages (First Action Allowance).

* cited by examiner

*Primary Examiner* — Layla D Berry
(74) *Attorney, Agent, or Firm* — Maine Cernota & Curran

(57) ABSTRACT

Provided is a method for separating and purifying fucoidan, including: S1, subjecting a *Undaria pinnatifida* powder to extraction in hot water, filtering, and concentrating by rotary evaporation in sequence to obtain a concentrate; S2, adding an aqueous calcium chloride solution to the concentrate obtained in S1 in batches, where the aqueous calcium chloride solution is excessive; S3, adding chitosan-crosslinked graphene oxide/ferroferric oxide to a resulting material system obtained in S2 to obtain a mixed system, placing the mixed system at room temperature, and chelating excessive calcium ions obtained in S2 while adsorbing proteins by the chitosan-crosslinked graphene oxide/ferroferric oxide; S4, conducting filtration to filter out a solid, and obtaining a liquid, which is an aqueous fucoidan solution; and S5, adding ethanol to a resulting concentrate obtained in S4 to precipitate the fucoidan, and then filtering and drying the fucoidan to obtain purified fucoidan.

8 Claims, No Drawings

METHOD FOR SEPARATING AND PURIFYING FUCOIDAN

RELATED APPLICATIONS

This application claims the benefit of Chinese Patent Application No. 202410907832.5, filed with the China National Intellectual Property Administration on Jul. 8, 2024, which is herein incorporated by reference in its entirety for all purposes.

FIELD OF THE INVENTION

The invention relates to the field of chemical separation and purification, and more particularly to a method for separating and purifying fucoidan.

BACKGROUND OF THE INVENTION

Fucoidan is a sulfated water-soluble intercellular polysaccharide with L-fucose as a characteristic monosaccharide. That is, fucoidan is a polymer of α-L-fucose-4-sulfate, which is a macromolecule with a structure including a small amount of monosaccharides. In the prior art, fucoidan in seaweeds is commonly extracted with hydrochloric acid as follows: extraction is conducted for 7 h at room temperature with a pH of 2, and a resulting extract solution is subjected to neutralization, precipitation, dialysis, concentration, lyophilization, etc. to obtain fucoidan.

There are the following three common methods for separating and purifying fucoidan: water extraction-alcohol precipitation, water extraction-acid precipitation, and water extraction-acid precipitation-enzymatic hydrolysis. Seaweed polysaccharides usually include fucoidan and alginic acid, both of which are soluble in water. In the prior art, fucoidan or alginic acid alone is usually extracted. For example, through the combination of first acid extraction and then alcohol extraction, only fucoidan is produced, and alginic acid can hardly be separated from proteins, resulting in a waste of polysaccharides difficult to extract in addition to the target.

Chinese patent CN116813809A discloses a method for separating and purifying fucoidan and an electric field-membrane separation device. In this patent, in order to achieve the separation of proteins and fucoidan, a dialysis membrane with a pore size of 18 nm to 32 nm is adopted, and a voltage is applied for 3 h to 6 h. However, this patent also merely allows the separation and purification of fucoidan alone, which is easy to cause a waste of the alginic acid resource.

What is needed, therefore, is an improved method for separating and purifying fucoidan.

SUMMARY OF THE INVENTION

An improved method for separating and purifying fucoidan is disclosed.

According to the present disclosure, calcium chloride is added in multiple batches during an extraction process to produce a calcium alginate gel, and excessive calcium ions are allowed to effectively chelate chitosan crosslinked on graphene oxide/ferroferric oxide ("/" means "loaded with", i.e., graphene oxide/ferroferric oxide means graphene oxide loaded with ferroferric oxide), such that graphene oxide can actively adsorb proteins while the proteins are prevented from directly contacting the graphene oxide and contaminating the graphene oxide, which can effectively improve the separation efficiency and purity of fucoidan.

To solve the technical problem, the present disclosure provides the following technical solutions:

Provided is a method for separating and purifying fucoidan, including the following steps:

S1, subjecting a *Undaria pinnatifida* powder to extraction in hot water with a solid-to-liquid ratio of 1 g:20 mL, conducting filtration to obtain a filtrate, and concentrating the filtrate through rotary evaporation to a volume of 40% to 50% of an initial volume of the filtrate to obtain a concentrate;

S2, adding an aqueous calcium chloride solution with a mass fraction of 2% to the concentrate obtained in S1 in batches, such that a calcium alginate gel is produced until there are free calcium ions in the concentrate, that is, the aqueous calcium chloride solution is excessive;

S3, adding chitosan-crosslinked graphene oxide/ferroferric oxide to a resulting material system obtained in S2 to obtain a mixed system, placing the mixed system at room temperature, and chelating excessive calcium ions obtained in S2 while adsorbing proteins by the chitosan-crosslinked graphene oxide/ferroferric oxide;

S4, conducting filtration to filter out a solid, and obtaining a liquid, where the liquid is an aqueous fucoidan solution; and concentrating the liquid to a volume of 40% to 50% of an initial volume of the liquid; and S5, adding ethanol to a resulting concentrate obtained in S4 to precipitate the fucoidan, and then filtering and drying the fucoidan to obtain purified fucoidan.

In some embodiments, the solid filtered out in S4 is dispersed in deionized water, and the chitosan-crosslinked graphene oxide/ferroferric oxide that is adsorbed with proteins and calcium ions obtained in S3 is separated from the calcium alginate gel obtained in S2 through magnetic adsorption. In the present disclosure, the chitosan-crosslinked graphene oxide/ferroferric oxide is separated from the calcium alginate gel through a magnetic force, which shows a high separation efficiency.

In some embodiments, the calcium alginate gel is placed in a lactic acid solution to form alginic acid, and a resulting system is subjected to precipitation to separate out the alginic acid. In the present disclosure, alginic acid is separated after fucoidan is separated and purified. Moreover, the separation of alginic acid is achieved through a phase change, which shows a prominent separation effect.

In some embodiments, the chitosan-crosslinked graphene oxide/ferroferric oxide is prepared by a process including the following steps:

S31, dissolving chitosan in an acetic acid solution, adjusting a pH of a resulting solution to 5.5 to 6.0 using an NaOH solution, and stirring to obtain a chitosan solution;

S32, dispersing graphene oxide/ferroferric oxide in the chitosan solution, and conducting ultrasonic dispersion, such that the chitosan is self-assembled on the graphene oxide/ferroferric oxide, where a mass ratio of the graphene oxide/ferroferric oxide to the chitosan is in a range of 1:10 to 1:20;

S33, adding glutaraldehyde and conducting a crosslinking reaction; and

S34, subjecting a resulting reaction product to suction filtration to obtain a precipitate, and subjecting the precipitate to washing, lyophilizing, and crushing in sequence to obtain chitosan-crosslinked graphene oxide/ferroferric oxide particles.

In some embodiments, in S33, the crosslinking reaction is conducted under the following conditions:
the crosslinking reaction is conducted at a temperature of 40° C. to 60° C. for 60 min to 120 min; and a mass ratio of the glutaraldehyde to the chitosan is 0.15:1.

In some embodiments, the graphene oxide/ferroferric oxide is prepared by a process including the following steps:
S321, dissolving $FeCl_3 \cdot 6H_2O$ and $FeCl_2 \cdot 4H_2O$ at a molar ratio of 2:1 in deionized water, and stirring for full dissolution to obtain an aqueous solution of the $FeCl_3 \cdot 6H_2O$ and the $FeCl_2 \cdot 4H_2O$;
S322, adding the aqueous solution of the $FeCl_3 \cdot 6H_2O$ and the $FeCl_2 \cdot 4H_2O$ to a graphene oxide solution under constant speed stirring, and further stirring to obtain a homogeneous mixed solution;
S323, adding aqueous ammonia dropwise to the homogeneous mixed solution obtained in S322 under stirring until a pH of the homogeneous mixed solution is adjusted to 8 to 9, and conducting crystallization to obtain the graphene oxide/ferroferric oxide; and
S324, separating the graphene oxide/ferroferric oxide by suction filtration, and washing and vacuum-drying a resulting separated graphene oxide/ferroferric oxide to obtain a graphene oxide/ferroferric oxide magnetic nanocomposite,
where a mass ratio of graphene oxide to the $FeCl_3 \cdot 6H_2O$ is in a range of 6:1 to 8:1.

In some embodiments, during adding the aqueous ammonia dropwise for crystallization, a material system is heated at a temperature of 60° C. to 80° C.

In some embodiments, in S1, the extraction in the hot water is conducted under the following parameters:
the extraction in the hot water is conducted at a temperature of 90° C. to 95° C. for 3 h to 4 h under ultrasound.

In the present disclosure, the hot extraction is conducted in a neutral environment, which reduces the consumption of an acid and an alkali, facilitates the separation and purification, and is conducive to maintaining the integrity of polysaccharide molecules.

In some embodiments, in S2, the aqueous calcium chloride solution is added in each batch for gelation under the following conditions:
the gelation is conducted at a temperature of 25° C. to 50° C. for 10 min to 20 min.

In some embodiments, in S3, the chitosan-crosslinked graphene oxide/ferroferric oxide is added in an amount of 4.0 mg/mL to 6.0 mg/mL relative to a volume of the resulting material system.

With the above technical solutions, some embodiments of the present disclosure achieve the following beneficial effects:

In the present disclosure, the extraction is conducted in the hot water to obtain fucoidan, alginic acid, and proteins dispersed in an aqueous solution. A resulting solution is concentrated to obtain a concentrate, and then an aqueous calcium chloride solution with a mass fraction of 2% is added to the concentrate in batches, such that a calcium alginate gel is produced until there are free calcium ions in the concentrate, that is, the aqueous calcium chloride solution is excessive. The excessive calcium chloride ensures that carboxyl of alginic acid in an extracted crude sugar can form a stable ionic bond with a calcium ion to cause the crosslinking among molecular chains to produce a gel with a three-dimensional network structure. The excessive calcium chloride ensures that alginic acid is fully gelated.

Then, chitosan-crosslinked graphene oxide/ferroferric oxide is added, and amino in chitosan chelates a calcium ion under a neutral condition. The chelated calcium ions promote the formation of an isolation layer from chitosan around graphene oxide. As a result, the direct attachment of proteins to a surface of graphene oxide can be avoided while the graphene oxide adsorbs proteins, which facilitates the desorption of proteins and calcium ions after magnetic separation of chitosan-crosslinked graphene oxide/ferroferric oxide and thus can allow the repeated use of chitosan-crosslinked graphene oxide/ferroferric oxide.

The present disclosure achieves the separation of alginic acid and proteins in a raw material from a liquid phase through calcium alginate gelation and chitosan-crosslinked graphene oxide/ferroferric oxide, so as to allow the separation and purification of fucoidan and then the separation of proteins from the calcium alginate gel through magnetic adsorption. In the present disclosure, calcium alginate is also separated and purified while fucoidan is separated and purified, and chitosan-crosslinked graphene oxide/ferroferric oxide for protein adsorption can be recycled. The separation and purification of fucoidan has a reduced cost and can effectively prevent proteins from being directly adsorbed onto a surface of graphene oxide, which can solve the problem that graphene oxide can hardly be recycled due to the contamination by proteins. Chitosan crosslinked on graphene oxide/ferroferric oxide can form stable coordination bonds with calcium ions through amino and hydroxyl to allow rapid chelation. In the same liquid-phase environment, the adsorption of proteins involves more complex interactions, such as hydrogen bonding, van der Waals forces, and hydrophobic interactions, and these interactions may take more time to establish, such that the adsorption speed of proteins is lower than the chelation speed of calcium ions. In the present disclosure, the use of excessive calcium ions can ensure the surrounding and protection of a surface of graphene oxide in a protein adsorbent while still maintaining the adsorption trend of graphene oxide to proteins. Therefore, the present disclosure can allow the effective enrichment of alginic acid and proteins in fucoidan and the stable separation of alginic acid and proteins subsequently, thereby effectively achieving the separation and purification of polysaccharides and ensuring the high purities.

The water extraction is adopted in the present disclosure. The neutral leaching environment can reduce the hydrolysis of polysaccharides to produce complete polysaccharide molecules. Moreover, fucoidan and alginic acid can be quickly and effectively separated, and the consumption of an acid, an alkali, and an organic solvent can be effectively reduced. Therefore, the present disclosure can improve the production efficiency while reducing the production cost.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

In order to further explain the technical solutions of the present disclosure, the present disclosure is detailed below with reference to specific examples.

Example 1

In this example, a method for separating and purifying fucoidan was disclosed and performed as follows:
S1: A *Undaria pinnatifida* powder was subjected to extraction in hot water with a solid-to-liquid ratio of 1 g:20 mL, filtration was conducted to obtain a filtrate, and the filtrate was concentrated through rotary evaporation to a volume of 40% of an initial volume of the filtrate.

In S1, the extraction in the hot water was conducted under the following parameters:
the extraction in the hot water was conducted at 90° C. for 3 h, where during the first 0.5 h, ultrasound was applied with an ultrasonic frequency of 100 kHz.

S2: an aqueous calcium chloride solution with a mass fraction of 2% was added to a concentrate obtained in S1 in three batches, such that a calcium alginate gel was produced until there were free calcium ions in the concentrate, that is, the aqueous calcium chloride solution was excessive. A volume of the aqueous calcium chloride solution was equal to a volume of the concentrate.

In S2, the aqueous calcium chloride solution is added in each batch for gelation under the following conditions:
the gelation was conducted at 35° C. for 10 min.

After each gelation, filtration was conducted until no gel was produced in the raw material and it was confirmed that there were free calcium ions in the concentrate.

S3: Chitosan-crosslinked graphene oxide/ferroferric oxide was added to a resulting material system obtained in S2 to obtain a mixed system, and the mixed system was placed at room temperature for 2 h, and excessive calcium ions obtained in S2 were chelated while proteins were absorbed by the chitosan-crosslinked graphene oxide/ferroferric oxide.

In S3, the chitosan-crosslinked graphene oxide/ferroferric oxide was added in an amount of 4.0 mg/mL relative to a volume of the resulting material system.

S4: Filtration was conducted to filter out a solid, and thereby a liquid was obtained, where the liquid was an aqueous fucoidan solution. The liquid was concentrated to a volume of 50% of an initial volume of the liquid.

The solid filtered out in S4 was dispersed in deionized water, and the chitosan-crosslinked graphene oxide/ferroferric oxide that was adsorbed with proteins and calcium ions obtained in S3 was separated from the calcium alginate gel obtained in S2 through magnetic adsorption. In the present disclosure, the solid-state chitosan-crosslinked graphene oxide/ferroferric oxide as a protein adsorbent is effectively separated from the calcium alginate gel through magnetic adsorption, which shows a high separation efficiency and a prominent separation effect.

S5: Ethanol was added to a resulting concentrate obtained in S4 to precipitate the fucoidan, and the fucoidan was subjected to filtration and dying to obtain purified fucoidan.

In this example, the calcium alginate gel was placed in a lactic acid solution with a pH of 1.8 to form alginic acid, and a resulting system was subjected to precipitation to separate out the alginic acid. In the present disclosure, alginic acid is separated after fucoidan is separated and purified. Moreover, the separation of alginic acid is achieved through a phase change, which shows a prominent separation effect.

The chitosan-crosslinked graphene oxide/ferroferric oxide in this example was prepared by a process as follows:

S31: Chitosan was dissolved in an acetic acid solution, a pH of a resulting solution was adjusted to 5.5 using an NaOH solution, and stirring was conducted to obtain a chitosan solution.

S32: Graphene oxide/ferroferric oxide was dispersed in the chitosan solution, and ultrasonic dispersion was conducted, such that the chitosan was self-assembled on the graphene oxide/ferroferric oxide.

A mass ratio of the graphene oxide/ferroferric oxide to the chitosan was 1:10.

S33: Glutaraldehyde was added thereto and a crosslinking reaction was conducted.

In S33, the crosslinking reaction was conducted under the following conditions:
the crosslinking reaction was conducted at 40° C. for 60 min, and a mass ratio of the glutaraldehyde to the chitosan was 0.15:1.

S34: A resulting reaction product was subjected to suction filtration to obtain a precipitate, and the precipitate was subjected to washing, lyophilization, and crushing in sequence to obtain chitosan-crosslinked graphene oxide/ferroferric oxide particles.

The graphene oxide/ferroferric oxide in this example was prepared by a process as follows:

S321: $FeCl_3 \cdot 6H_2O$ and $FeCl_2 \cdot 4H_2O$ were dissolved at a molar ratio of 2:1 in deionized water, and stirring was conducted for full dissolution to obtain an aqueous solution of $FeCl_3 \cdot 6H_2O$ and $FeCl_2 \cdot 4H_2O$.

S322: The aqueous solution of the $FeCl_3 \cdot 6H_2O$ and the $FeCl_2 \cdot 4H_2O$ was added to a graphene oxide solution under constant speed stirring, and stirring was further conducted to obtain a homogeneous mixed solution.

S323: Aqueous ammonia was added dropwise to the homogeneous mixed solution obtained in S322 under stirring until a pH of the homogeneous mixed solution was adjusted to 8.0, and crystallization was conducted to obtain graphene oxide/ferroferric oxide.

During adding the aqueous ammonia dropwise for crystallization, a material system was heated at 60° C.

S324: The graphene oxide/ferroferric oxide was separated through suction filtration, and a resulting separated graphene oxide/ferroferric oxide was washed, and then vacuum-dried to obtain a graphene oxide/ferroferric oxide magnetic nanocomposite.

A mass ratio of graphene oxide to the $FeCl_3 \cdot 6H_2O$ was 6:1.

In the present disclosure, the extraction in the hot water was conducted in a neutral environment, which reduces the consumption of an acid and an alkali, facilitates the separation and purification, and is conducive to maintaining the integrity of polysaccharide molecules.

Example 2

The main differences between this example and Example 1 were detailed in Tables 1 and 2.

Example 3

The main differences between this example and Example 1 were detailed in Tables 1 and 2.

Example 4

The main differences between this example and Example 1 were detailed in Tables 1 and 2.

Example 5

The main differences between this example and Example 1 were detailed in Tables 1 and 2.

Comparative Example 1

In this comparative example, a method for separating and purifying fucoidan was disclosed and performed as follows:
S1: Preparation of a Crude Fucoidan Product
A seaweed was crushed, water was added in a volume 8 times a volume of the seaweed, a microwave was applied at 60° C. for 60 min, and filtration was conducted to obtain a filtrate and a filter residue. Water in a volume 5 times a volume of the filter residue was added to the filter residue, stirring was conducted for 15 min, and filtration was conducted. The above process was repeated 3 times. Resulting filtrates were collected and combined to obtain a combined filtrate.

Activated carbon was added to the combined filtrate, stirring was conducted for 60 min, and filtration was conducted to obtain a final filtrate. A mass of the activated carbon was 0.2% of a mass of the seaweed.

The final filtrate was subjected to vacuum distillation for concentration to obtain a concentrate in a volume 1/5 of a volume of the final filtrate.

Ethanol in a volume 8 times the volume of the concentrate was added to the concentrate, stirring was conducted at 5° C. for 60 min, and filtration was conducted to obtain the crude fucoidan product.

S2: Separation and Purification

The crude fucoidan product was dissolved in water with a mass 10 times a mass of the crude fucoidan product to obtain a product solution, and the product solution was centrifuged to obtain a first supernatant. The first supernatant was subjected to multi-stage purification with an anion exchange column, and elution was conducted with deionized water and 0.05 M, 0.1 M, 0.2 M, 0.3 M, 0.5 M, 0.6 M, and 0.8 M NaCl solutions, sequentially. According to an elution curve, eluates of the 0.5 M NaCl solution were collected, combined, concentrated, and centrifuged to obtain a second supernatant. The second supernatant was collected and subjected to dialysis and lyophilization to obtain the separated and purified fucoidan.

Comparative Example 2

This comparative example was different from Example 4 mainly in that:

In S2, an aqueous calcium chloride solution with a mass fraction of 2% was added to the concentrate obtained in S1 in batches, and a calcium alginate gel was separated after being completely formed in the concentrate. A concentration of calcium ions in an extract solution was determined through titration, and then sodium carbonate was added to precipitate the calcium ions. When it was determined that there were no free calcium ions in the extract solution, the protein adsorbent, namely, chitosan-crosslinked graphene oxide/ferroferric oxide, was added.

Comparative Example 3

This comparative example was different from Example 4 mainly in that:

Graphene oxide/ferro ferric oxide as a protein adsorbent was added in this comparative example at the same amount as in Example 4.

TABLE 1

Process parameters for separation and purification of fucoidan in Examples 1 to 5

| Steps and parameters | | Example 1 | Example 2 | Example 3 | Example 4 | Example 5 |
|---|---|---|---|---|---|---|
| S1 | *Undaria pinnatifida* powder | 1 g: 20 ml | 1 g: 20 ml | 1 g: 20 ml | 1 g: 20 ml | 1 g: 20 ml |
| | Concentrated volume | 40% | 50% | 40% | 40% | 40% |
| | Extraction in hot water | 90° C.; 4 h | 95° C.; 3 h | 95° C.; 3 h | 90° C.; 4 h | 95° C.; 4 h |
| S2 | $V_{CaCl2}$ : $V_{concentrate}$ | 1:1 | 1:1 | 1:1 | 1:1 | 1:1 |
| | Gelation process | 10 min; 35° C. | 20 min; 25° C. | 15 min; 45° C. | 15 min; 35° C. | 15 min; 35° C. |
| | $Ca^{2+}$ concentration after gelation | 0.12% | 0.18% | 0.09% | 0.11% | 0.14% |
| S3 | Adsorbent | 4.0 mg/ml | 5.0 mg/ml | 6.0 mg/ml | 2.0 mg/ml | 8.0 mg/ml |

TABLE 2

Process parameters for preparation of chitosan-crosslinked GO/Fe$_3$O$_4$ in Examples 1 to 5

| Steps and parameters | | Example 1 | Example 2 | Example 3 | Example 4 | Example 5 |
|---|---|---|---|---|---|---|
| S31 | pH of a chitosan solution | 5.5 | 6.0 | 5.5 | 6.0 | 5.5 |
| S32 | $m_{CTS}$ : $m_{GO/Fe3O4}$ | 1:10 | 1:15 | 1:20 | 1:10 | 1:10 |
| S323 | pH | 8.0 | 9.0 | 8.5 | 9.0 | 8.5 |
| | Crystallization temperature | 60° C. | 70° C. | 80° C. | 70° C. | 80° C. |
| | $m_{GO}$:$M_{FeCl3}$ | 6:1 | 7:1 | 8:1 | 6:1 | 6:1 |
| S33 | Crosslinking temperature | 40° C. | 50° C. | 60° C. | 60° C. | 60° C. |
| | Crosslinking time | 60 min | 90 min | 120 min | 90 min | 90 min |

For the purities, yields, and protein and calcium ion contents of fucoidan and alginic acid that were separated and purified in Examples 1 to 5 and Comparative Examples 1 to 3, specific data is detailed in Tables 3 and 4.

TABLE 3

Performance indexes of fucoidan obtained in Examples 1 to 5 and Comparative Examples 1 to 3

| Index | Yield (%) | Purity (%) | $Ca^{2+}$ content (%) | Protein content (%) |
|---|---|---|---|---|
| Example 1 | 7.23 | 98.3 | 0.32 | 0.59 |
| Example 2 | 7.17 | 97.7 | 0.41 | 0.48 |
| Example 3 | 7.25 | 98.1 | 0.35 | 0.44 |
| Example 4 | 7.33 | 98.0 | 0.42 | 0.72 |
| Example 5 | 7.35 | 98.0 | 0.46 | 0.45 |
| Comparative Example 1 | 0.85 | 91.3 | / | 6.52 |
| Comparative Example 2 | 7.26 | 96.8 | 0.39 | 0.32 |
| Comparative Example 3 | 7.31 | 97.1 | 0.42 | 0.35 |

TABLE 4

Performance indexes of alginic acid obtained in
Examples 1 to 5 and Comparative Examples 1 to 3

| Index | Yield (%) | Purity (%) | $Ca^{2+}$ content (%) | Protein content (%) |
|---|---|---|---|---|
| Example 1 | 16.83 | 96.8 | 0.87 | 0.35 |
| Example 2 | 16.92 | 97.1 | 0.80 | 0.28 |
| Example 3 | 16.26 | 96.6 | 0.81 | 0.30 |
| Example 4 | 17.76 | 97.0 | 0.92 | 0.51 |
| Example 5 | 17.90 | 97.5 | 0.71 | 0.32 |
| Comparative Example 1 | / | / | / | / |
| Comparative Example 2 | 17.52 | 97.4 | 0.78 | 0.35 |
| Comparative Example 3 | 17.57 | 97.3 | 0.80 | 0.33 |

In the present disclosure, the chitosan-crosslinked graphene oxide/ferro ferric oxide that was absorbed with proteins was separated from the calcium alginate gel through magnetic adsorption, then added to a sodium hydroxide solution with a mass fraction of 10%, and heated to 80° C. and a reaction was conducted for 60 min, such that the proteins adsorbed to chitosan through interactions such as an electrostatic interaction, ester bonding, and a hydrophobic interaction were removed. After the protein desorption, the adsorbent was separated, washed until neutral, oven-dried, and recycled in Examples 1 to 5 and Comparative Examples 2 and 3. Protein contents in fucoidan and alginic acid produced accordingly are shown in Table 5.

TABLE 5

Influence of the recycling of the protein
adsorbent on protein contents in the products (%)

| Item | Fucoidan | Alginic acid |
|---|---|---|
| Example 1 | 0.50 | 0.31 |
| Example 2 | 0.47 | 0.32 |
| Example 3 | 0.45 | 0.35 |
| Example 4 | 0.75 | 0.54 |
| Example 5 | 0.45 | 0.33 |
| Comparative Example 2 | 5.65 | 0.39 |
| Comparative Example 3 | 7.12 | 0.41 |

As shown in Tables 3 to 5, in the present disclosure, the extraction is conducted in hot water to obtain fucoidan, alginic acid, and proteins dispersed in an aqueous solution. A resulting solution is concentrated to obtain a concentrate, and then an aqueous calcium chloride solution with a mass fraction of 2% is added to the concentrate in batches, such that a calcium alginate gel is produced until there are free calcium ions in the concentrate, that is, the aqueous calcium chloride solution is excessive. The excessive sodium chloride ensures that carboxyl of alginic acid in an extracted crude sugar can form a stable ionic bond with a calcium ion to cause the crosslinking among molecular chains to produce a gel with a three-dimensional network structure. The excessive calcium chloride ensures that alginic acid is fully gelated. As shown in Examples 1 to 5, then chitosan-crosslinked graphene oxide/ferroferric oxide is added, and amino and hydroxyl in chitosan chelate calcium ions under a neutral condition. The chelated calcium ions coordinate with chitosan to form an isolation layer around graphene oxide. As a result, the direct attachment of proteins to a surface of graphene oxide can be avoided while the graphene oxide adsorbs proteins, which facilitates the desorption of proteins after magnetic separation of chitosan-crosslinked graphene oxide/ferroferric oxide and thus can allow the repeated use of the chitosan-crosslinked graphene oxide/ferroferric oxide. The present disclosure achieves the separation of alginic acid and proteins in a raw material from a liquid phase through calcium alginate gelation and chitosan-crosslinked graphene oxide/ferroferric oxide, so as to allow the separation and purification of fucoidan and then the separation of proteins from the calcium alginate gel through magnetic adsorption. In the present disclosure, calcium alginate is also separated and purified while fucoidan is separated and purified, and chitosan-crosslinked graphene oxide/ferroferric oxide for protein adsorption can be recycled. Comparison of Examples 1 to 5 and Comparative Examples 2 and 3: In Comparative Example 2, because there are no residual calcium ions in the concentrate and thus chitosan in the chitosan-crosslinked graphene oxide/ferroferric oxide as a protein adsorbent fails to chelate calcium ions on a surface of graphene oxide, graphene oxide is easily adsorbed by proteins directly and it is difficult to desorb these proteins, resulting in the incomplete protein adsorption after recycling. In Comparative Example 3, because graphene oxide/ferroferric oxide is directly used to adsorb proteins initially, graphene oxide exhibits strong adsorption for proteins, and because an alkali solution has a limited desorption effect, fucoidan produced from the second use has an increased protein content. In the present disclosure, the separation and purification of fucoidan has a reduced cost and can effectively prevent proteins from being directly adsorbed onto a surface of graphene oxide, which can solve the problem that graphene oxide can hardly be recycled due to the contamination by proteins.

The water extraction is adopted in the present disclosure. The neutral leaching environment can reduce the hydrolysis of polysaccharides to produce complete polysaccharide molecules. Moreover, fucoidan and alginic acid can be quickly and effectively separated, and the consumption of an acid and an organic solvent can be effectively reduced. Therefore, the present disclosure can improve the production efficiency while reducing the production cost.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method for separating and purifying fucoidan, comprising the following steps:
- S1, subjecting a *Undaria pinnatifida* powder to extraction in hot water with a solid-to-liquid ratio of 1 g:20 mL, conducting filtration to obtain a filtrate, and concentrating the filtrate through rotary evaporation to a volume of 40% to 50% of an initial volume of the filtrate to obtain a concentrate;
- S2, adding an aqueous calcium chloride solution with a mass fraction of 2% to the concentrate obtained in S1 in batches, such that a calcium alginate gel is produced until there are free calcium ions in the concentrate, that is, the aqueous calcium chloride solution is excessive; and
- S3, adding chitosan-crosslinked graphene oxide/ferroferric oxide to a resulting material system obtained in S2 to obtain a mixed system, placing the mixed system at room temperature, and chelating excessive calcium ions obtained in S2 while adsorbing proteins by the chitosan-crosslinked graphene oxide/ferroferric oxide;
- wherein in S3, the chitosan-crosslinked graphene oxide/ferroferric oxide is added in an amount of 4.0 mg/mL to 6.0 mg/mL relative to a volume of the resulting material system;
- S4, conducting filtration to filter out a solid, and obtaining a liquid, wherein the liquid is an aqueous fucoidan solution; and concentrating the liquid to a volume of 40% to 50% of an initial volume of the liquid; and
- S5, adding ethanol to a resulting concentrate obtained in S4 to precipitate the fucoidan, and then filtering and drying the fucoidan to obtain purified fucoidan;
- wherein the method further comprises, before adding the chitosan-crosslinked graphene oxide/ferroferric oxide to the resulting material system obtained in S2, preparing the chitosan-crosslinked graphene oxide/ferroferric oxide by the following steps:
  - S31, dissolving chitosan in an acetic acid solution, adjusting a pH of a resulting solution to 5.5 to 6.0 using an NaOH solution, and stirring to obtain a chitosan solution;
  - S32, dispersing graphene oxide/ferroferric oxide in the chitosan solution, and conducting ultrasonic dispersion, such that the chitosan is self-assembled on the graphene oxide/ferroferric oxide, wherein a mass ratio of the graphene oxide/ferroferric oxide to the chitosan is in a range of 1:10 to 1:20;
  - S33, adding glutaraldehyde and conducting a crosslinking reaction; and
  - S34, subjecting a resulting reaction product to suction filtration to obtain a precipitate, and subjecting the precipitate to washing, lyophilizing, and crushing in sequence to obtain chitosan-crosslinked graphene oxide/ferroferric oxide particles; and the method further comprises, before dispersing the graphene oxide/ferroferric oxide in the chitosan solution, preparing the graphene oxide/ferroferric oxide by the following steps:
  - S321, dissolving $FeCl_3 \cdot 6H_2O$ and $FeCl_2 \cdot 4H_2O$ at a molar ratio of 2:1 in deionized water, and stirring for full dissolution to obtain an aqueous solution of the $FeCl_3 \cdot 6H_2O$ and the $FeCl_2 \cdot 4H_2O$;
  - S322, adding the aqueous solution of the $FeCl_3 \cdot 6H_2O$ and the $FeCl_2 \cdot 4H_2O$ to a graphene oxide solution under constant speed stirring, and further stirring to obtain a homogeneous mixed solution;
  - S323, adding aqueous ammonia dropwise to the homogeneous mixed solution obtained in S322 under stirring until a pH of the homogeneous mixed solution is adjusted to 8 to 9, and conducting crystallization to obtain the graphene oxide/ferroferric oxide; and
  - S324, separating the graphene oxide/ferroferric oxide by suction filtration, and washing and vacuum-drying a resulting separated graphene oxide/ferroferric oxide to obtain a graphene oxide/ferroferric oxide magnetic nanocomposite.

2. The method of claim 1, wherein the method further comprises, after conducting the filtration to filter out the solid, dispersing the solid filtered out in S4 in deionized water, and separating the chitosan-crosslinked graphene oxide/ferroferric oxide that is adsorbed with proteins and calcium ions obtained in S3 from the calcium alginate gel obtained in S2 through magnetic adsorption.

3. The method of claim 2, wherein the calcium alginate gel is placed in a lactic acid solution to form alginic acid, and a resulting system is subjected to precipitation to separate out the alginic acid.

4. The method of claim 1, wherein in S33, the crosslinking reaction is conducted under the following conditions:
the crosslinking reaction is conducted at a temperature of 40° C. to 60° C. for 60 minutes to 120 minutes; and
a mass ratio of the glutaraldehyde to the chitosan is 0.15:1.

5. The method of claim 1, wherein a mass ratio of graphene oxide to the $FeCl_3 \cdot 6H_2O$ is in a range of 6:1 to 8:1.

6. The method of claim 1, wherein during adding the aqueous ammonia dropwise for crystallization, a material system is heated at a temperature of 60° C. to 80° C.

7. The method of claim 1, wherein in S1, the extraction in the hot water is conducted under the following parameters:
the extraction in the hot water is conducted at a temperature of 90° C. to 95° C. for 3 hours to 4 hours under ultrasound.

8. The method of claim 1, wherein in S2, the aqueous calcium chloride solution is added in each batch for gelation under the following conditions: the gelation is conducted at a temperature of 25° C. to 50° C. for 10 minutes to 20 minutes.

* * * * *